United States Patent
Corless

[15] 3,677,320
[45] *July 18, 1972

[54] TIRE BEAD SEATING AND INFLATION APPARATUS AND METHOD FOR USING SAME

[72] Inventor: Lee M. Corless, Grosse Pointe Woods, Mich.

[73] Assignee: B & J Manufacturing Company, Glenwood, Ill.

[ * ] Notice: The portion of the term of this patent subsequent to Jan. 5, 1988, has been disclaimed.

[22] Filed: Oct. 12, 1970

[21] Appl. No.: 79,876

[52] U.S. Cl. ............................................................157/1.1
[51] Int. Cl. .......................................................B60c 25/06
[58] Field of Search ................157/1.1; 144/288 A; 152/415; 222/3

[56] References Cited

UNITED STATES PATENTS 2,900,015  8/1959  Harrison..................................157/1.1
3,461,938  8/1969  Mueller...................................157/1.1

Primary Examiner—Granville Y. Custer, Jr.
Attorney—Whittemore, Hulbert & Belknap

[57] ABSTRACT

A method and apparatus for bead seating and inflating tubeless tires on a vehicle wheel is provided. The system is particularly adapted for use in connection with large tires such as are used on farm tractors. The apparatus for seating the tire beads comprises an annular tube having orifice means for injection of air under pressure peripherally around the tire through the space between the wheel rim and the tire bead. The inflation apparatus comprises means for connection to the conventional tire valve. Control means are provided for simultaneously injecting air into the tire from the bead seating apparatus and through the conventional tire valve. The control means include means for initially injecting high pressure air for rapid bead seating and inflation. Means are provided to discontinue the flow of high pressure air at a predetermined safe point and to continue to completely inflate the tire by means of low pressure air. The method of the invention relates to the manipulation of the tire and control apparatus during seating and inflation.

11 Claims, 4 Drawing Figures

PATENTED JUL 18 1972 3,677,320
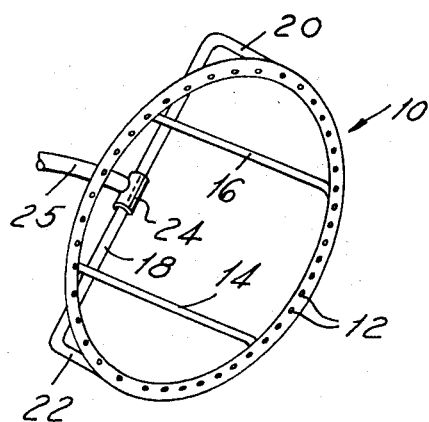
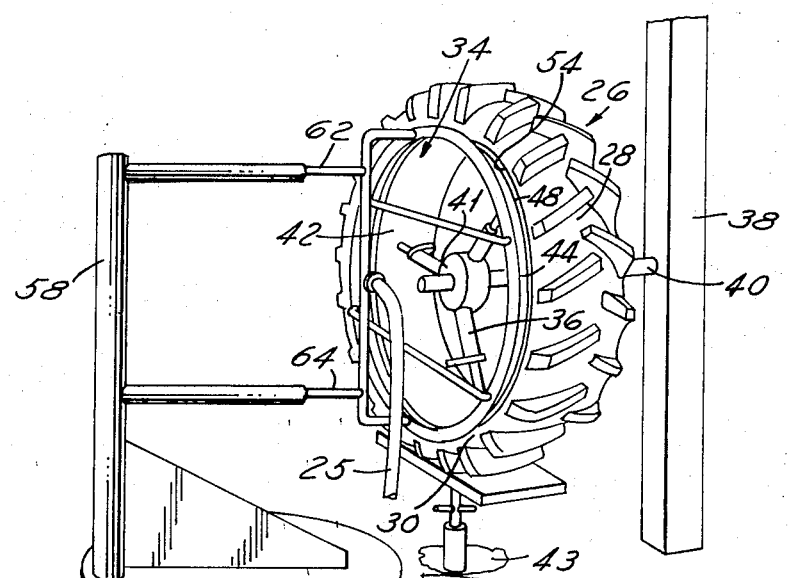
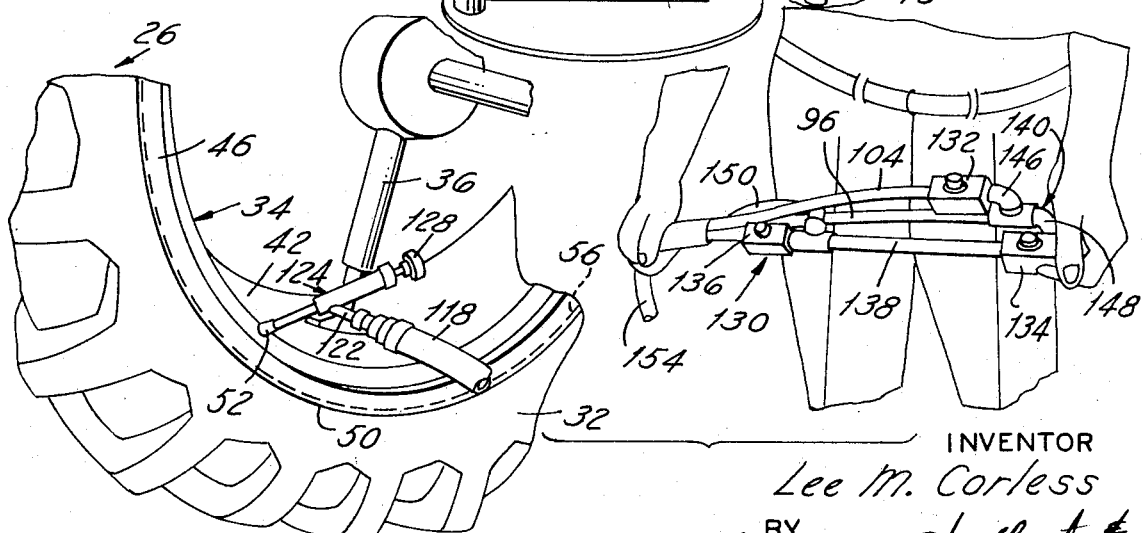
INVENTOR
Lee M. Corless
BY
Littlemore Halbert &
Belknap
ATTORNEYS INVENTOR
Lee M. Corless
BY
ATTORNEYS

TIRE BEAD SEATING AND INFLATION APPARATUS AND METHOD FOR USING SAME

BACKGROUND OF THE INVENTION

Inflation of tubeless tires on vehicle wheels has proved to be a problem. When a tubeless tire is mounted on a wheel, the sidewalls do not normally form a sealing engagement with the rim of the wheel. Various mechanical techniques have been utilized in the past to bulge the sidewalls out and cause engagement of the beads with the wheel rims whereupon the tire may be inflated through the conventional tire valve. Such techniques have proved to be awkward and time consuming and have not been readily adaptable to some types of tires, such as radial ply and glass belted tires.

In my co-pending U.S. Pat. application, Ser. No. 800,679, filed Feb. 19, 1969, now Pat. No. 3,552,469, issued Jan. 5, 1971, I have disclosed apparatus for inflating tubeless tires which utilizes only a simple annular tubular member having orifices spaced around the periphery thereof through which air is injected into a tire through the gap between the tire bead and wheel rim. The device does not employ any working parts which must slide or otherwise fit exactly on the tire or wheel. There is no wear of the parts and the problem of accurate dimensions is considerably reduced. The apparatus therein disclosed has proved to be satisfactory for most types of tires. However, in accordance with the present invention, I have provided a method and apparatus for mounting large sized tires of the tubeless variety. Such tires are frequently utilized in off-the-road construction equipment and farm tractors. In the past, great difficulty has been encountered when it has been attempted to utilize tubeless tires for such purposes. The sidewalls of such tires are relatively thick and inflexible. Further, the crowns of such tires are quite thick. As a consequence, it has not been possible to readily bulge the sidewalls out to make contact of the bead with the wheel rim by means of mechanical apparatus. The result has been that such tires have continued to be utilized in connection with inner tubes. The inner tube has a number of disadvantages both in terms of cost and in terms of function. The present invention provides means for bead seating and inflating such tires which permits the use of tubeless tires for these large tire applications.

SUMMARY OF THE INVENTION

Apparatus for inflating tubeless tires on a vehicle wheel and which includes a conventional tire valve is provided. The apparatus comprises tire bead seating apparatus to surround a rim of the wheel. The tire bead seating apparatus has orifice means for injection of air under pressure peripherally around the tire through the space between the wheel rim and the bead of a non-inflated tubeless tire mounted on the wheel. Means to supply air under pressure to the bead seating apparatus is provided. Also provided is tire inflation means to supply air under pressure to the tire interior through the conventional tire valve. Control means are provided to discontinue the supply of air under pressure to the bead seating apparatus when the tire beads have been substantially seated and to discontinue the supply of air under pressure to the tire inflation means when the desired inflation pressure has been obtained. A method is provided for utilizing the apparatus to perform the desired operations.

IN THE DRAWINGS

FIG. 1 is a perspective view of the tire bead seater in accordance with the present invention;

FIG. 2 is a view of the tire bead seater of FIG. 1 and associated tire inflation mechanism positioned to inflate a tire;

FIG. 3 is a view of the reverse side of the apparatus illustrated in FIG. 2 and

Figure 4:
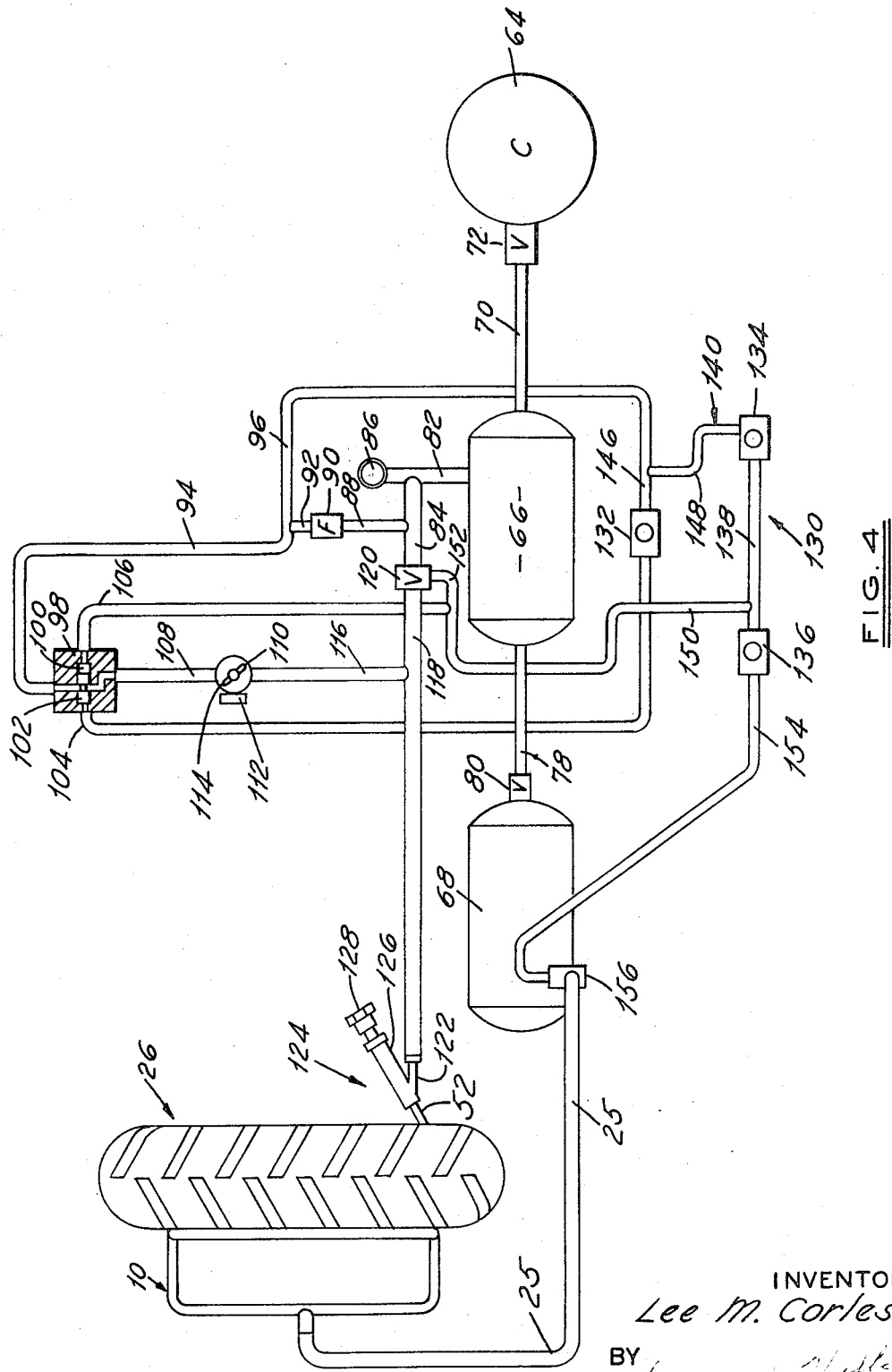
FIG. 4 is a schematic view of the pneumatic circuitry employed in the invention.

Referring to FIG. 1, the tire bead seater 10 comprises an annular tubular member having a diameter somewhat larger than the outer diameter of a vehicle wheel and also the inner diameter of a vehicle tire. A single bead seater 10 may service tires having some variation in inner diameter. Bead seaters having larger or smaller diameters than that shown may be provided for inflation of various sized tires. The bead seater 10 may be fabricated from various materials such as metal, plastic or rubber. The bead seater 10 may be a cast element or it may be formed by bending a length of tubing into a circle and sealing the free ends to each other.

A plurality of orifices 12 are provided in spaced apart relationship around the interior periphery of the bead seater 10. The orifices may be provided at, for example, two inch intervals although other spacings are permissible depending upon the application, size of orifices, size of ring and the like. Instead of a circular opening as shown, a continuous or interrupted slit may be used to form the orifice means. Nozzles also may be utilized as orifice means. Further, the ring may be segmented as long as the spaces between the segments are not so large as to prevent the formation of a substantially continuous ring of air under pressure during use of the device.

A pair of spaced apart tubular members 14, 16 extend across the bead seater 10 and are secured thereto at the outer ends thereof as by welding or brazing or other means suitable to the material from which the bead seater is fabricated. The members 14, 16 are positioned on the outer surface of the bead seater 10 to permit the bead seater to extend slightly over the rim of a wheel. The members 14, 16 function as locating means and also to rigidify the structure.

The bead seater 10 includes means for injecting air at two points from a single air source. A tubular member 18 extends across the center of the bead seater at approximately right angles to the members 14, 16. The member 18 is joined at each end to the bead seater by means of tube sections 20, 22. The sections 20, 22 are in fluid communication with the interior of the tubular bead seater. A nozzle 24 is provided at the center of the tubular member 18 for injecting air from a source of air under pressure. The air passes through the tubular member 18 and sections 20, 22 and thence into the bead seater 10 whereupon it travels around the interior thereof to be expelled through the orifices 12 as individual air jets. The bead seater 10 is ideally adapted for inflation of large tires, such as farm tractor tires. Consequently, the size of the nozzle 24 is relatively large, as for example, 1 ¼ inches, to receive a large air hose for supplying a sufficient volume of air for inflation of a tire. The nozzle may be larger or smaller depending upon the size of the tire which is to be inflated. A flexible air hose 25 is connected to the nozzle 24.

In accordance with the method of the invention, the tire bead seater 10 is utilized as illustrated in FIGS. 2 and 3. A tubeless tire 26, illustratively a large farm tractor tire having thick relatively rigid crown 28 and sidewalls 30, 32, is first mounted on a wheel 34. This may be accomplished by means of conventional tire mounting apparatus. The wheel 34, in turn, is mounted in a vertical position by means of a three pronged jack 36 positioned in the center of the wheel and support structure comprising an upstanding post 38 having an axle like member 40 extending at right angles therefrom. The member 40 extends through the hub 41 of the jack 36 and supports the assembly. A floor jack 43 is provided to center the tire 26 on the wheel 34. It will be noted that the wheel 34 comprises a central cylindrical section 42 having angularly outwardly extending annular flange portions 44, 46 which terminate in annular rims 48, 50. A valve assembly 52 is provided on the cylindrical section 40 for inflation of the tire.

It will be noted that even when the tire is pushed to one side of the wheel so that bead 56 of sidewall 32 contacts wheel rim portion 50, the opposite bead 54 of the sidewall 30 is not in sealing engagement with the wheel rim portion 48. Thus, the tire cannot be inflated by injecting air through the valve assembly 52 because air will escape around the bead 54 as rapidly as it is injected into the tire. The relatively rigid nature of the tire and the large thicknesses of the various tire components, as a practical matter, prevent seating of the beads by applying external pressure to the tire. It is possible to flex some types of tires by banding or other means around the crown to cause outward flexing of the sidewalls and sealing engagement of the beads. However, such a practice has not been practical with respect to large size tires such as the tire 26. Consequently, conventional practice has been to utilize inner tubes with such tires.

After the tire 26 has been mounted on the wheel 34 and the tire pushed to one side of the wheel to engage the rim portion 50, the tire bead seater 10 is moved to a position adjacent the wheel rim as illustrated in FIG. 2. The bead seater 10 is mounted on a frame 58 by means of movable arms 62, 64 which provide means for moving the bead seater into and out of the position illustrated in FIG. 2. In this position, the orifices 12 are directed substantially into the space between the wheel rim 48 and the tire bead 54. When air under pressure is expelled from the orifices, a substantially continuous cylindrical curtain of air is injected into this space. The curtain of air causes an internal pressure to develop in the tire which results in the sidewalls flexing outwardly and the beads substantially seating against the wheel rim portions 48, 50. The initial physical contact of bead 56 with rim portion 50 provides a sufficient fluid flow restriction to permit seating of the beads. It is then possible to complete inflation of the tire by means of the valve assembly 52.

The apparatus for controlled inflation of the tire 26 is best illustrated in FIGS. 3 and 4. As will be noted, the source of compressed air is an air compressor 64. The output of the compressor 64 is supplied to a tank 66 via an air line 70. An on-off valve 72 is provided at the outlet of the compressor to control injection of air under pressure into the tank 66. The tank 66 is directly connected to a second tank 68 by means of an air line 78. An on-off valve 80 is provided at the inlet to the tank 68. In operation, both of the valves 72, 80 are opened when it is desired to fill the tanks. When the desired pressure in each tank, for example 175 psi, has been reached, the valves are closed thus isolating the two tanks from each other and from the compressor. The tanks serve as reservoirs of air under pressure. The tank 68 is utilized in connection with the bead seater 10 while the tank 66 is utilized to fully inflate the tire after the beads have been seated.

Separation of the two tanks results in a safety factor in the utilization of the apparatus. High pressure air is used to inflate the tire. It would be possible to explode the tire and injure workmen if such high pressure air was injected into the tire after the safe air pressure had been reached. Inflation is then completed by the use of normal low pressure air. The amount of air in the tank 66 is not sufficient to cause tire explosion. When a safe inflation value has been reached, which valve is dependent upon the particular tire being inflated and which is ascertainable from the tire manufacturers' specifications, there is not sufficient additional capacity in the tank 66 to result in exploding the tire. The air in tank 68 is not available during the inflation process because of closure of the valve 80. Any excess air in tank 68 will be harmlessly exhausted to the atmosphere in the event that the bead seater 10 is inadvertently supplied with air after the beads have been seated. This technique is relatively fail-safe and is preferred over a system wherein, for example, a large tank is used or where air is taken directly from a compressor tank although such systems may be used if proper safety precautions are employed.

A rigid tubular outlet 82 extends from the tank 66. A rigid tubular structure 84 extends from the outlet 82 intermediate the ends thereof. An air gauge 86 is provided on the outer end of outlet 82. The gauge 86 is observed during filling of the tanks 66, 68 by means of the compressor 64 to apprise the operator when the desired pressure in the tanks has been reached. The gauge 86 may be utilized at any time to indicate the pressure in the tank 66.

A relatively small diameter air line 88 extends from the tubular section 84 to an air filter 90. The term "small diameter air line", in the context of the present disclosure generally means a tube of about one-half inch in diameter. The air filter 90 filters any foreign matter from air passing through line 88. This purified air is ultimately used via several pilot valves to actuate main valves. As will be appreciated, the mechanisms associated with such valving are relatively fine and filtration of the air is desirable to avoid fouling.

The output of the filter 90 is fed via air line 92 to a "T" from which branch lines 94, 96 extend. One of the lines 94 extends to the inlet of the main valve 98. The valve 98 is utilized as a means for injecting low pressure air into the tire after the tire has been substantially inflated by means of high pressure air. The valve 98 includes a central bore 100 in which a piston 102 is slidably mounted. Pilot air is injected into the bore 100 from each end thereof by means of air lines 104, 106. Injection of air through line 104 will cause the piston to move to the right as viewed in FIG. 4 resulting in closing of the valve. Injection of air through line 106 will move the piston to the left causing the valve to be opened.

An air line 108 extends from the outlet of the valve into connection with a pressure regulating device 110. An air gauge 112 and crank 114 are provided on the pressure regulator 110. The outlet pressure of the regulator may be adjusted as desired by manipulation of the crank 114. The outlet pressure may be observed by means of the gauge 112. Generally speaking, the desired outlet pressure for low pressure inflation of tires of the type under consideration is about 40 or less pounds per square inch.

An air line 116 extends from the outlet of the regulator into connection with large air line 118. The line 118 may have a diameter of, for example, three-quarters of an inch. A main valve 120 is provided upstream of the connection of line 116. The main valve 120 is open for high pressure inflation of a tire. When it is closed, low pressure air will continue to be injected into the tire via the pressure regulator 110. The large size of the line 118 is to permit large volumes of high pressure air to be injected for rapid inflation of the tire to sealingly seat the tire beads. The line 118 is connected to the inlet 122 of a device 124 which is connected to the valve assembly 52.

The device 124 includes a tubular portion 126 which is in axial alignment with the valve assembly. A plunger apparatus 128 is rotatably and slidably mounted in the portion 126. The plunger apparatus 128 has a wrench-like element on the inner end thereof which is engageable with the valve core. Prior to inflation of the tire, the valve core is unscrewed from the valve by means of the apparatus 128 which is then withdrawn to thereby provide an unobstructed opening for injection of air into the tire. After inflation, the valve core is again screwed into place.

The other line 96 which extends from the outlet of the filter 90 is directed to control structure 130 which includes three pilot valves 132, 134, 136. The outlet of the valve 134 is connected to the inlet of the valve 136 by means of a rigid tube 138. The tube 138 is long enough to cause sufficient separation of the valves 134, 136 so as to require the operator to hold the device with both hands and use a separate hand to actuate each valve. This construction aids in preventing inadvertent actuation of the valves and gives the operator convenient, quick control of the mechanism so that he may act efficiently during inflation of a tire. Each of the valves has a manually depressible button which, when depressed, causes opening of the valve. The buttons are spring actuated to return to the initial closed position of the valves upon release of manual pressure thereupon. As will be noted in FIG. 3, a rigid U-shape tube 140 is provided on the end of the unit 130. The valve 132 is carried on the end of this tube. Consequently, the valve 132 is also fixedly positioned. It is located adjacent the valve 134 for manipulation by the same hand which manipulates valve 134.

The air line 96 is connected to the center of tubular portions 146, 148. The portions 146, 148 extend to the inlets of valves 132, 134. The air line 104 is connected to the outlet of valve 132. It will therefore be appreciated that opening of valve 132 will cause the piston 102 to move to a position wherein the valve 98 is closed. Such closure is accomplished after the tire 26 has been completely inflated. The valve 132 is thus opened when it is desired to discontinue inflating a tire.

A branch air line 150 extends from the line 138 at a point between the valves 134, 136. The line 150 divides into branches 106, 152. The branch 106, as previously described, is connected to the valve 98. When air pressure is applied via line 106, the valve 98 is actuated to the open position. Similarly, line 152 is connected to the valve 120. When air pressure is applied to the valve 120 via line 152, this valve is opened. The valve 120 is spring actuated to the closed position. Therefore, upon discontinuance of air pressure via line 152, the valve 120 will close. Air bleed means are provided to relieve this pressure. Means may be provided for the valve 120 or its pilot valve 134 or for both to bleed off air from line 152 with the consequence that the spring is effective to close valve 120 upon closure of the valve 134 which controls injection of line pressure into this particular portion of the system.

Air line 154 extends from the outlet of the valve 136 to another main valve 156. The valve 156 is the same type as the valve 120. Consequently, opening of valve 136 with the valve 134 open will result in the valve 156 opening and air from the tank 68 being applied to the bead seater 10 to cause seating of the beads of the tire 26. Closure of valve 136 is effective to cause closure of valve 156 and discontinue high pressure air being fed to the bead seater 10.

Operation of the apparatus may now be understood. In practice, tire 26 is mounted on wheel 34 and the wheel is mounted in the upright position by means of the jack 36. The tire is pushed to the off side of the wheel to partially seat one bead. The bead seater 10 is then moved into a position abutting against the wheel rim. The device 124 is mounted on the valve assembly 52 and the valve core is temporarily removed. It is assumed that the tanks 66, 68 have previously been filled to the desired capacity.

Pilot valves 134, 136 are then both opened simultaneously. This results in valves 98, 120, 156 being opened substantially simultaneously. The operator observes the tire 26. As soon as the beads have substantially seated against the wheel rims, he releases the valve 136 causing this valve to close along with valve 156 to discontinue the supply of air to the bead seater 10. At this point, the beads almost make sealing engagement with the rims. The partial seal is sufficient to permit complete tire inflation via the conventional valve. High pressure air is continued to be injected into the tire via the air line 118 until the tire pressure reaches a safe predetermined level which may be determined by observing the tire. This is visually and audibly observable. The valve 134 may be closed prior to such seating for safety purposes. Closing of valve 134 results in closure of valve 120 and discontinuance of the supply of high pressure air to the valve assembly 52. Low pressure air will continue to be supplied via the valve 98 until the tire has reached the desired degree of inflation. When this occurs, the valve 132 is opened resulting in the valve 98 closing and thereby discontinuing the supply of low pressure air. The device 124 is then manipulated to re-install the valve core.

Illustratively, the tire 26 and wheel 34 have been illustrated in the vertical position. It will be appreciated, however, that the wheel may be in any position desired and that the bead seater 10 may be applied to either side of the tire with equal effectiveness. If the tire is oriented horizontally, the bead seater may be used either on the top or bottom of the tire. Additionally, it is not necessary that the wheel be separated from the vehicle upon which it is mounted. The tire may be mounted on a tractor which has been jacked up in the field and inflated in the same manner as described. The various components of the apparatus may be conveniently located in a service truck so as to be mobile thereby permitting servicemen to mount tires in the field.

What I claim as my invention is:

1. Apparatus for inflating tubeless tires on a vehicle wheel and which includes a conventional tire valve, comprising tire bead seating apparatus to surround a rim of a wheel, said apparatus having orifice means for injection of air under pressure peripherally around the tire through the space between the wheel rim and the bead of a non-inflated tubeless tire mounted on the wheel, means to supply air under pressure to said bead seating apparatus, tire inflation means to supply air under pressure to the tire interior through the conventional tire valve, and control means to initiate and discontinue the supply of air under pressure to the bead seating apparatus when the tire beads have been substantially seated and to initiate and discontinue the supply of air under pressure to said tire inflation means when the desired inflated pressure has been attained.

2. Apparatus as defined in claim 1, further characterized in that the means to supply air under pressure to the bead seating apparatus and to the tire inflating means each includes a separate reservoir for air under pressure, the reservoir for air under pressure associated with the tire inflation means being of insufficient capacity to cause damage to the tire in the event of over-inflation thereof.

3. Apparatus as defined in claim 1, further characterized in the provision of a normally closed pilot operated main valve between said tire bead seating apparatus and the means to supply air under pressure thereto, a pair of pilot valves connected in series, one being upstream from the other, between the means to supply air under pressure and said pilot operated main valve, said pilot valves being effective, upon both being opened, to cause opening of said pilot operated main valve to permit passage of air under pressure into the bead seating apparatus, said pilot operated main valve including means to automatically close upon the closing of either of said pilot valves.

4. Apparatus as defined in claim 3, further characterized in the provision of a second normally closed pilot operated main valve located between the conventional tire valve and the supply of air under pressure therefor, an air line connected at a point between said pilot valves and said second pilot operated main valve, opening of the upstream pilot valve being effective to cause opening of said second pilot operated main valve to connect the conventional tire valve to the supply of air under pressure, said second pilot operated main valve including structure for automatic closing thereof upon closing of said upstream pilot valve.

5. Apparatus as defined in claim 3, further characterized in the provision of rigid structure between said pilot valves to fixedly space said valves apart, said valves being spaced apart a distance to prevent actuation of both valves by means of one hand.

6. Apparatus as defined in claim 5, further characterized in that the rigid structure between said pilot valves is a rigid tube, said assembly being hand holdable and portable.

7. Apparatus as defined in claim 1, further characterized in the provision of second tire inflation means including means to supply air under lower pressure than said previously mentioned tire inflation means to inject low pressure air to the tire interior through the conventional tire valve to fully inflate the tire after discontinuance of the supply of air under pressure from said previously mentioned tire inflation means.

8. Apparatus as defined in claim 7, further characterized in the provision of a third pilot operated main valve interposed between said means to supply air under pressure to the tire inflating means and said conventional valve, an air pressure regulator connected to the output of said third main valve to reduce line pressure to the desired lower pressure, said upstream pilot valve being connected to said third main valve to cause opening of said third main valve upon opening of said upstream pilot valve, a third pilot valve connected between the supply source of air under pressure and said third main valve, said third pilot valve being operative, upon opening thereof, to cause closure of said third main valve.

9. Apparatus as defined in claim 1, further characterized in that said tire bead seating apparatus comprises a tubular structure to surround a rim of the wheel, at least a portion of said tubular structure being of larger diameter than the diameter of the wheel, orifice means in said portion around the periphery of the tube for injecting air under pressure through the space between the wheel rim and the bead of a non-inflated tubeless tire mounted on the wheel, and at least two inlets on the tube for supplying air under pressure to the interior of the tube.

10. The method of inflating a tubeless tire on a vehicle wheel comprising the steps of injecting relatively high pressure air under pressure into the tire peripherally around the tire through the space between one wheel rim and the adjacent tire bead to partially inflate the tire and cause the tire bead to almost make sealing contact with the wheel rim, simultaneously inflating the tire by injecting relatively high pressure air through the conventional tire valve, discontinuing the injection of air under pressure into the tire peripherally when the tire bead almost makes sealing contact but continuing inflation through the conventional tire valve until a predetermined safe limit of air pressure in the tire has been reached, then completely inflating the tire by injecting relatively low pressure air through the conventional tire valve.

11. The method as defined in claim 10, further characterized in that said tire and wheel are mounted in a substantially vertical position and forcing the other bead of the tire against the flange opposite said one wheel rim prior to inflation whereby said other bead forms with the tire flange a restriction to the flow of air thereby preventing escape of substantial amounts of air from the tire during the bead seating operation.

* * * * *